(12) United States Patent
Schemenauer et al.

(10) Patent No.: US 8,827,677 B1
(45) Date of Patent: Sep. 9, 2014

(54) LIP ADJUSTMENT INDICATOR AND SYSTEM

(75) Inventors: Jesse J. Schemenauer, Chippewa Falls, WI (US); Leigh P. Darrow, Chippewa Falls, WI (US)

(73) Assignee: Allied Dies, Inc., Chippewa Falls, WI (US)

( * ) Notice: Subject to any disclaimer, the term of this patent is extended or adjusted under 35 U.S.C. 154(b) by 266 days.

(21) Appl. No.: 13/112,823

(22) Filed: May 20, 2011

(51) Int. Cl.
*B29C 47/00* (2006.01)
*B29C 47/16* (2006.01)

(52) U.S. Cl.
CPC .................................. *B29C 47/165* (2013.01)
USPC ........................................................ 425/150

(58) Field of Classification Search
CPC .................................................... B29C 47/165
USPC ........................................................ 425/150
See application file for complete search history.

(56) References Cited

U.S. PATENT DOCUMENTS

| | | | |
|---|---|---|---|
| 3,377,655 A * | 4/1968 | Kucharski et al. | ............ 425/466 |
| 5,259,747 A | 11/1993 | Cloeren | |
| 6,017,207 A | 1/2000 | Druschel | |
| 6,663,375 B1 | 12/2003 | Ulcej | |
| 2007/0290398 A1 | 12/2007 | Druschel et al. | |

* cited by examiner

*Primary Examiner* — Alison Hindenlang
(74) *Attorney, Agent, or Firm* — Anthony J. Bourget (57) ABSTRACT

The invention comprises a die apparatus including a flexible lip for adjusting a gap between the flexible lip and a second lip, along with an indicator system for measuring the lip and a corresponding adjustment. In one aspect the apparatus includes a sliding bar that communicates with the flexible lip. In addition, the sliding bar communicates with an indicator member having a body and an arm, where the arm corresponds with indicia and the indicator measure lip gap adjustment along the indicia in response to movement of the sliding member.

16 Claims, 6 Drawing Sheets

Fig. 6

LIP ADJUSTMENT INDICATOR AND SYSTEM

BACKGROUND OF THE INVENTION

1. Field of the Invention

The present invention relates generally to dies for extruding materials, and more specifically to die adjustment devices for adjusting a gap or gaps between adjacent portions of die bodies, along with indicators to measure the adjustments.

2. Background Information

Flat sheet or film extrusion dies typically include a pair of die bodies that operate to form an outlet through which material is extruded. Each die body may typically include a lip, where the lips may at least partially form the outlet. Further, at least one of the lips may be a flexible lip that is capable of being adjusted to provide a particular sheet or film thickness of the material.

The flexible lips of the prior art extrusion dies may be adjusted and controlled by a controlling mechanism, as exemplarily described in U.S. Pat. No. 6,663,375 ("'375") to Ulcej and U.S. Pat. No. 6,017,207 ("'207") to Druschel. As shown in the '375 and '207 patents, a controlling mechanism may include links, where the links directly push or pull on a portion of a flexible lip to cause movement of the flexible lip. Further, the links may be actuated by movement of an adjustment bar that slides along a main portion of the die body having the flexible lip.

While the prior art has provided examples of features of die lip adjusting mechanisms, there is always room for further improvement.

SUMMARY OF THE INVENTION

Although die adjusting mechanisms may be known for adjusting a gap between lips of adjacent die bodies, the inventors have realized improvements thereon. Applicants have realized deficiencies in the prior art and have combined the below objectives in a novel manner to provide a die adjusting device that has been developed for the purpose of being able to swiftly and accurately measure the adjustment of spacing between adjacent lips of die bodies.

In accordance with an aspect of the invention, the device is directed toward an indicator system usable with die apparatuses including two die bodies. The die bodies of a die apparatus may include a main body, a hinge and a lip. Further, the dies and indicator system may be used with or may be a part of an adjustment system. The adjustment system may include a cross-bar, linear moving members, slide fasteners, pivoting members, pivot fasteners, a sliding member and an indicator system, all in adjustable connection, or integrally formed, with the die bodies. At least one of the die bodies may include a flexible lip that moves toward and away from a paired lip of the second die body, where the movable lip moves about a hinge coupled to a main body. The indicator system may measure the movement of the movable lip.

In operation of the inventive system, the sliding member, within or upon the main body portion, may connect to a plurality of pivoting members and at least one indicator member via first pivot fasteners and an indicator fastener, respectively. Further, the pivoting members and indicator member may be pivotally secured to the main body portion with second pivot fasteners and indicator fastener, respectively. Indicator member includes an indicator arm and indicator body, where the indicator arm may optionally extend through or around, or both, an end plate connected to the die body. In one aspect, each pivoting member includes a tongue which engages a groove of an associated linear moving member. Each linear moving member may be in operable engagement with a lip, such as being connected to the cross-bar, where the cross-bar may be in operable connection with a lip. Further, the plurality of linear moving members may include elongated openings located between a location of the groove and a location where linear moving members connect with the cross-bar. Such elongated openings allow linear moving members to undergo a sliding action relative to slide fasteners engaging linear moving members with the main body portion through the elongated openings. As a result of the connections, when the sliding member is adjusted, pivoting members pivot causing linear moving members to move linearly, and as the linear moving members move, the cross-bar operates on the flexible lip and moves the flexible lip toward or away from its paired lip depending on the direction of adjustment of the sliding member. In addition, an indicator arm of the indicator member moves in response to movement of the sliding member and indicates an amount the flexible lip has been adjusted. In one aspect the indicator arm may include an elongated opening to allow indicator body to undergo a sliding action relative to indicator fasteners.

The die industry places great emphasis on exact and accurate machining of components so that a die may operate efficiently, accurately and repeatedly. Applicants appreciate that the present system and components, as compared to other designs, accommodate increased uniformity and consistency of produced components. The individual components align with each other for surface area efficiency (and optimal leverage) that results in the ability to move the components, and the lip, with minimal force. Applicants have found that the above efficiencies and accurate adjustments exist in die products having great widths, including dies having lip lengths of over 100 inches. Having indicators that are accurate allows for a more refined and efficient working of a die.

An object of the inventive system is to provide an adjustment indicator mechanism for accurately and repeatedly adjusting dimensions of a gap between lips of die bodies in an extrusion die.

An object of the inventive system is to provide a single-point adjustment system on a dual lip die, where an adjustment indicator system allows for extension (or closing) of the lip opening range, and to do so quickly.

An object of the inventive system is to provide an adjustment indicator system for extrusion processes in the sheeting industry to allow for a wide range of lip-gap dimension measurements.

A further object of the inventive system is to provide an adjustment indicating system having a single reference point from which an amount of movement may be determined.

A further object of the inventive system is to provide an adjustment indicating system that indicates a direction and an amount of movement of a lip of the device.

A further object of the inventive system is to provide an adjustment indicating system that may be easily viewed by an operator from a point of operation.

It is a further object of the invention to provide a system for controlling machine-direction orientation in the extruded sheets. It is often desired to adjust the lip opening to be as close to the finished web thickness as possible. This is accomplished by controlling the machine direction (MD) orientation. The relationship between the lip opening and the finished web thickness is called the draw ratio. The adjustment indicator may allow for precise measurement and adjustment of the draw ratio.

It is a further object of the invention to provide an expedient system allowing for precise and repeatable measurement and adjustment of the gap between lips of die bodies in an extrusion die.

It is a further object of the invention to provide a system that uses simple parts having low manufacturing costs and parts that are easily replaceable.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 6 is an exploded view of a partial perspective view of a feature of the invention While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

Referring now to FIGS. 1-6, the invention is directed to a lip adjustment indicator system 10 used in, or with, a die, and typically used with a die assembly comprising at least two die bodies 11. The assembly may comprise an end plate 122 and die bodies 11a, 11b, where at least one of die bodies 11 may have a main body 12, a hinge 14 and a lip 16. Further, an exemplary adjustment system includes, but is not limited to, a system having a cross-bar 20, linear moving members 22, slide fasteners 28, pivoting members 24, and pivot fasteners 30, where these features communicate with one another and die body 11. Adjustment indicator system 10 may include measuring indicia 112, indicator member 114, indicator fasteners 120 and an indicator window or opening 124 (optional) in end plate 122. Indicator window or opening 124 may be any opening in end plate 122 or side of die 11a; for example, opening 124 may be completely surrounded by an opening as in the Figures, opening 124 may be open on at least one side so as to be notch-like, or opening 124 may take on another configuration. In other aspects no opening 124 is desired or required, and indicator may have an arm or other portion that extends over end plate 122 or other part of die 11. Adjustment indicator system 10 may be a part of the adjustment system or may be an add-on that communicates with the adjustment system.

Numerous terms are used throughout this description to describe features of the invention. These terms may generally be given their commonly understood meaning. For example, "direct contact" means that objects or features are physically touching and "elongated" is commonly known to mean a feature having a first dimension longer or greater than a second, transverse dimension.

First die body 11a may include a flexible lip 16a that is capable of being spatially moved with respect to a lip 16b of the second die body 11b (e.g., lip 16a of die body 11a may be moved toward and away from a paired lip 16b of die body 11b). The above elements of the adjustment system may be connected in such a manner so as to be able to control movement of lip 16 about hinge 14 by a single-point adjustment control 100 and sliding member 26, while that movement may be measured by indicator system 10 in response to adjustments of sliding member 26.

Die body 11a includes main body 12 with hinge 14 extending from main body 12 to flexible lip 16. Lip 16 may be separated from main body 12 by hinge 14 and space 15. When lip 16 is adjusted, it may move about or flex with hinge 14. Lip 16 includes a lip edge 19 which runs the length of lip 16. Matter that flows out from gap 16' (See FIG. 6) flows generally transverse lip edge 19.

In construction of the exemplary adjustment system, die body 11a may receive sliding member 26 at any location; for example, in one aspect sliding member 26 may be inserted into a slot 18 located on a top or upper side of die body 11a. Sliding member 26 may engage slot 18 in any manner that allows sliding member 26 to slide along slot 18 in response to an action by single-point adjustment control 100. A nut 102 or other element of adjustment control 100 may be rotated clockwise or counter-clockwise to operate either an opening or closing of gap 16'. Rotating nut 102 causes sliding member 26 to adjust within slot 18. Sliding member 26 may be in at least operative communication with a linear moving member 22, cross-bar 20 and indicator arm 116. It may be appreciated that a variety of alternative designs may be configured so that the sliding of sliding member 26 results in adjustment of lip 16.

Figure 1:
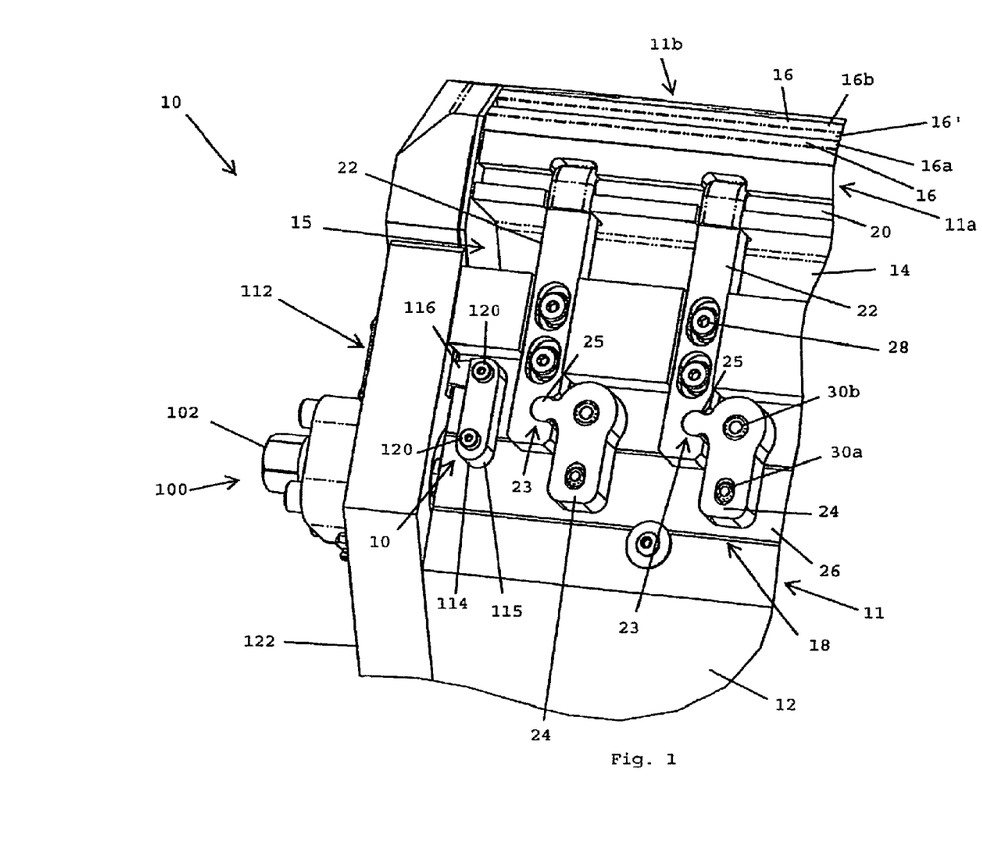
FIG. 1 is a partial perspective view of a feature of the invention.
Figure 2:
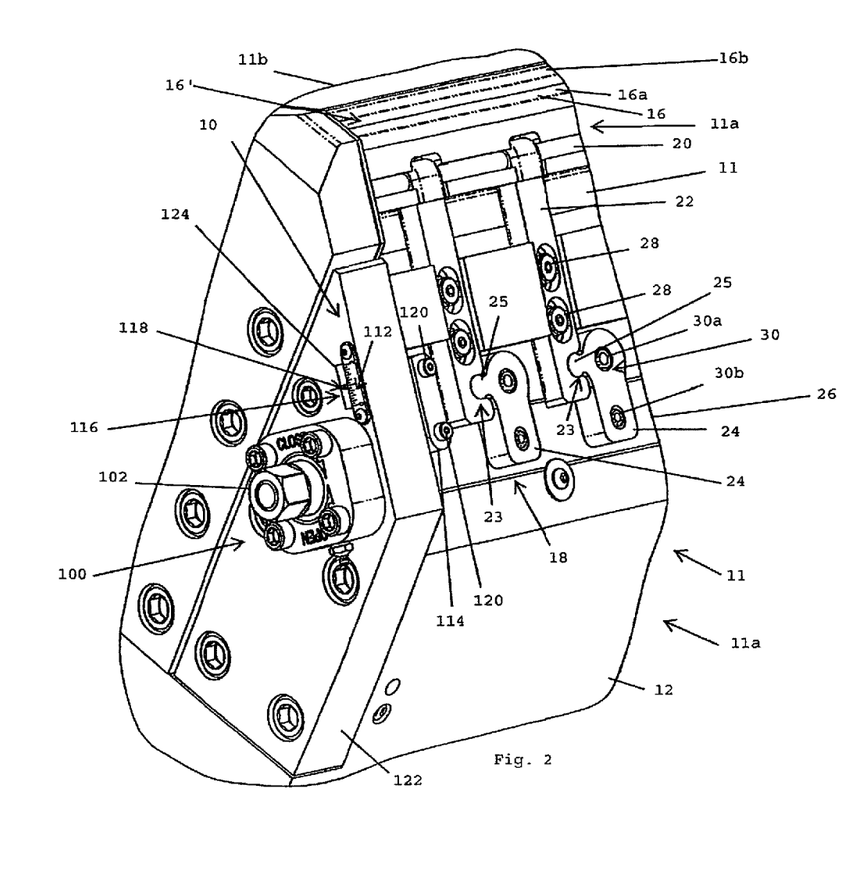
FIG. 2 is a rotated view of the partial perspective view of FIG. 1.

In addition to receiving sliding member 26, die body 11a may receive linear moving member(s) 22. Linear moving members 22 may engage die body 11a in any manner as long as it maintains a sliding engagement therewith. Further, linear moving members 22 may extend across space 15 from main body 12 to lip 16, as shown in FIGS. 1 and 2. In one aspect linear moving member(s) 22 do not directly contact lip 16, yet in another aspect members 22 may communicate with lip 16 through its operative connection with cross-bar 20 (as described below).

Figure 3:
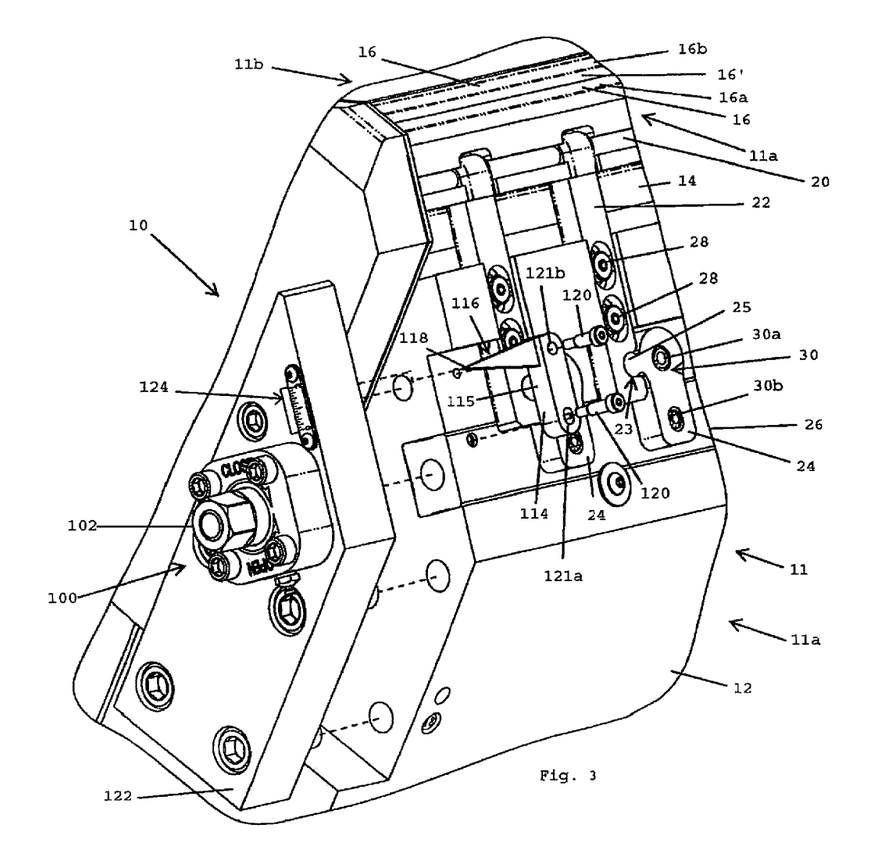
FIG. 3 is an exploded view of the rotated partial perspective view of FIG. 2.
Figure 4:
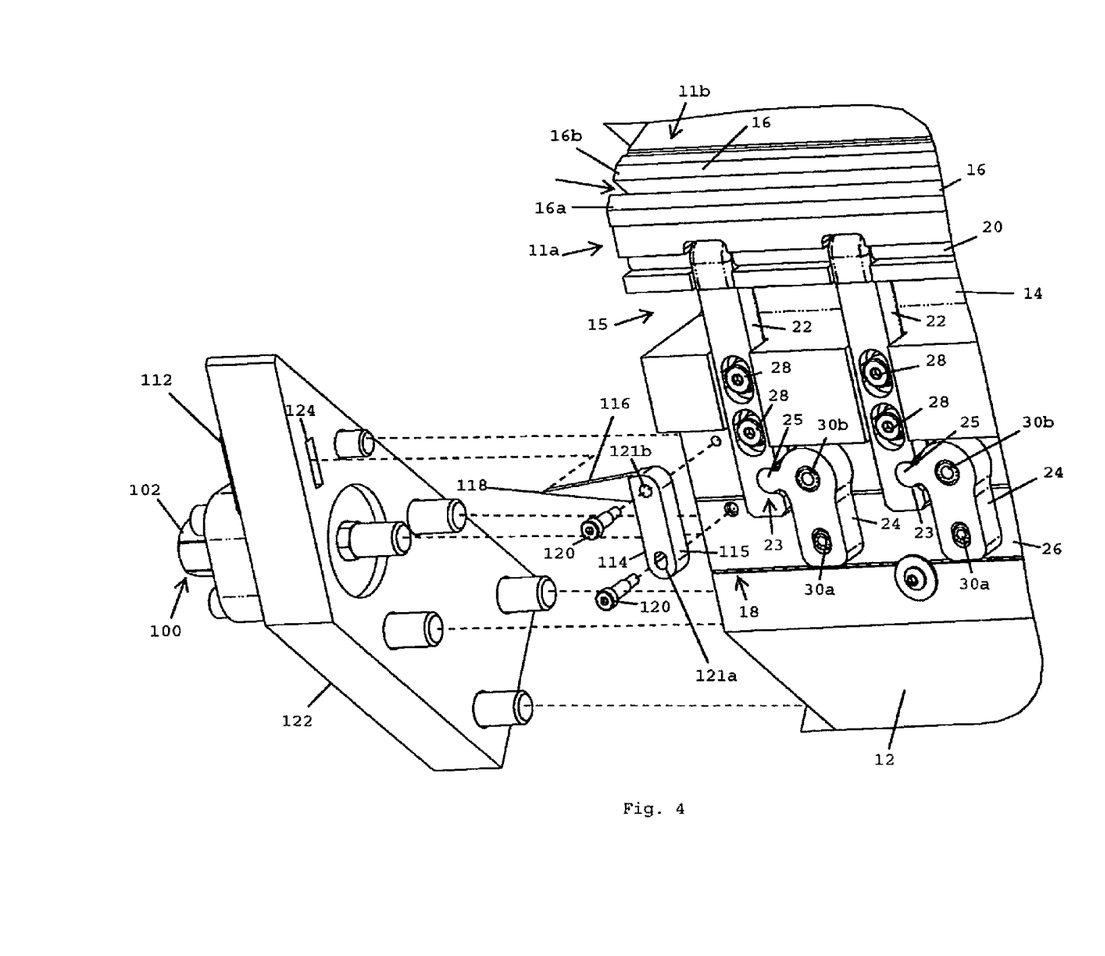
FIG. 4 is an exploded view of a partial perspective view of a feature of the invention.

Pivoting member(s) 24 may operatively connect to linear moving member(s) 22 and sliding member 26. Pivoting member(s) 24 may slidingly abut top side of die body 11a and may be fastened to sliding member 26 and top side through any known fastening or connection means that allows for pivoting of pivoting member 24. For example, pivoting member(s) 24 may be connected to sliding member 26 by any method allowing pivoting member(s) 24 to pivot about the connection, and pivoting member(s) 24 may be connected to top side by any method allowing for pivoting member(s) 24 to pivot about the connection. As seen in FIGS. 1-3, pivoting member(s) 24 may connect to sliding member 26 via pivot fastener 30a and connect to top side via second pivot fastener 30b. As mentioned, pivoting member(s) 24 may operatively connect to linear moving member(s) 22 and such operative connection, seen in FIGS. 1-3, may operate by tongue 25 of pivoting member(s) 24 rotatably engaging groove 23 of linear moving member(s) 22.

Cross-bar 20 may be received by die body 10 at, or within, lip 16 such that cross-bar 20 directly contacts lip 16. While cross-bar 20 may be configured to operatively contact lip 16, preferably cross-bar 20 directly contacts lip 16. In addition, as mentioned above, cross-bar 20 engages with linear moving member(s) 22. Cross-bar 20 may be in any type of contact with lip 16 and linear moving member(s) 22. For example, cross-bar 20 may be in direct contact with lip 16 and may be engaged through linear moving member(s) 22, where cross-bar 20 may slidably abut lip 16 and may be circumferentially and slidably engaged by linear moving member(s) 22. Cross-bar 20 may be made of any material, shape and size that is capable of operably engaging lip 16 and connecting to linear moving member 22.

Indicator system 10 communicates with the die assembly and an adjustment system. Functionally, system 10 operates in response to movement of sliding member 26 or other lip adjustment mechanism and measures relative movement of lip 16a with respect to a natural resting position of lip 16a, lip 16b, or other lip gap measurements. Indicator system 10 may comprise measuring indicia 112 on end plate 122 connected to die body 11a, an indicator opening 124 (optional) in end plate 122, an indicator member 114 having an indicator body 115, an indicator arm 116 extending from indicator body 115 and an indicator point 118 at a free end of indicator arm 116, where indicator member 114 is pivotally connected to main body 12 and sliding member 26. Indicator body 115 of indicator member 114 may connect to main body 12 and sliding member 26 by any known connection that permits pivoting movement about each separate connection; for example, the connection may be made with indicator fasteners 120, as seen in FIGS. 1-4. Indicator fasteners 120 may be inserted through fastener holes 121a, 121b in indicator body 115, where a first fastener hole 121a receiving a fastener 120 to be connected to sliding member 26 is a fastener hole allowing indicator member 114 to rotate about fastener 120 and with respect to connected sliding member 26 (fastener receiving hole 121a may optionally be an elongated fastener hole, as seen in FIG. 3, also allowing sliding member 26 to slide or translate along a single path). A second fastener hole 120b receiving a fastener 120 to be connected to main body 12 is a fastener hole allowing indicator member 114 to rotate about fastener 120 and with respect to connected main body 12. Fastener hole 120b may also be elongated.

Measuring or indicator indicia 112 (e.g., a ruler) may be positioned on end plate 122 adjacent opening 124, or at any other location adjacent indicator arm 116. Indicia may be provided on a plate or other item or measuring indicia 112 affixed to body 12 or may be applied directly to body 12 or end plate 122. Indicator member 114 may abut main body 12 at a location that allows indicator arm 116 and indicator point 118 to extend substantially through opening 124. Such position of indicator system 10 may allow an operator to view measurements relating to lip gap adjustment at a location proximal to single-point adjustment control 100. Alternatively or additionally, indicator arm 116 and indicator point 118 may communicate with indicia 112 in any desirable manner capable of indicating and displaying adjustments to gap 16' (e.g., displaying a distance of gap 16' between first lip 16a and second lip 16b). For example, instead of, or in addition to, arm 116 extending through opening 124, arm 116 may extend around or above end plate 122 allowing indicator point 118 to communicate with indicia 112.

Figure 5A:
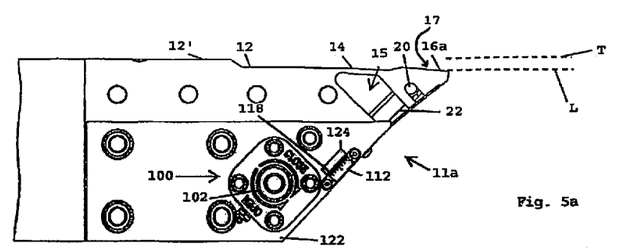
FIG. 5a is a side view of a feature of the invention in an open position.
Figure 5B:
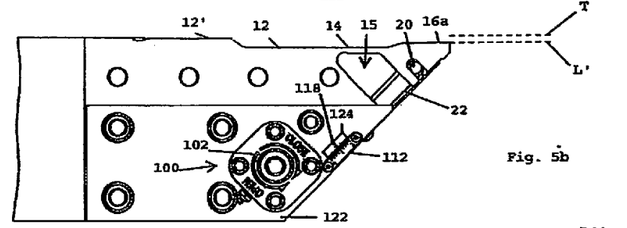
FIG. 5b is a side view of a feature of the invention in a neutral position.
Figure 5C:
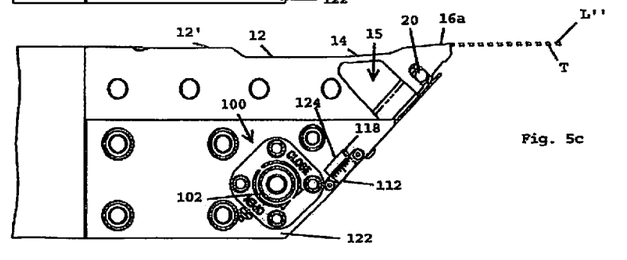
FIG. 5c is a side view of a feature of the invention in a closed position.
Figure 6:
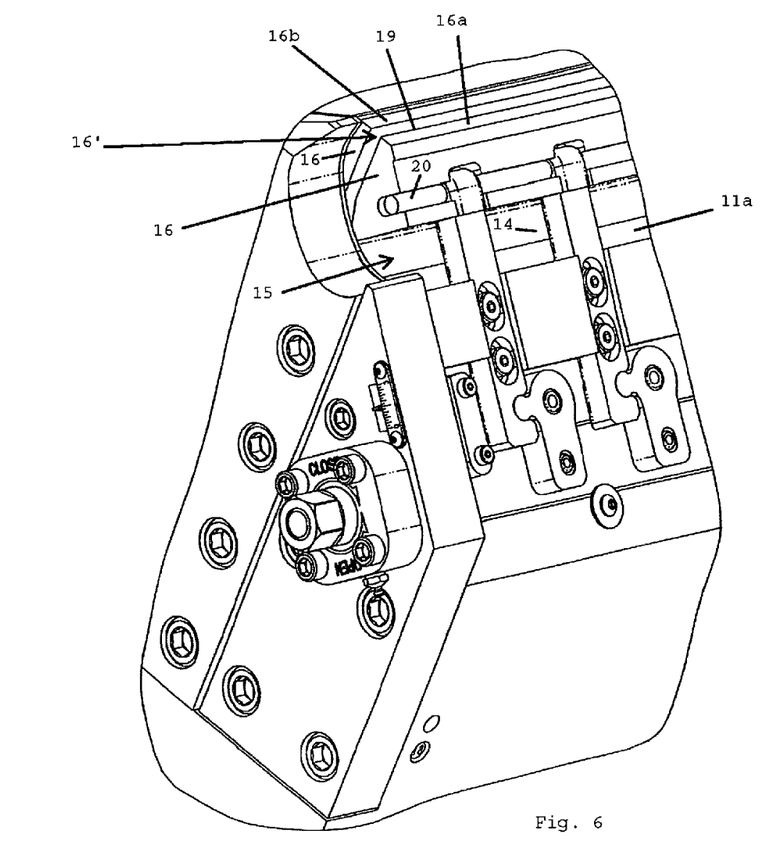

As seen in FIGS. 5a-5c, measuring or indicator indicia 112 may allow for measurements in movements of lip 16a and adjustments of gap 16' dimensions or other features. Indicator arm 116 and point 118 may communicate with indicia 112 in any manner to indicate to an operator an amount of lip adjustment from a reference position in response to movement of single-point adjustment control 100. For example, when sliding member 26 is in a neutral position, as in FIG. 5b, indicator point 118 may be at a middle location of indicia 112 and when sliding member 26 is moved in either direction in response to control 100, indicator point 118 may move to a corresponding side of the center of indicia 112 to indicate a particular adjustment of lip 16, as see in FIGS. 5a and 5c. In FIGS. 5a-5c, dotted line T is a reference position that corresponds with a projection line that projects from an edge 12' of main body 12 (i.e., edge 12' of main body maintains a generally fixed position and does not flex as does hinge 14 and corresponding lip 16a). Dotted lines L, L', L" are projection lines that project from and run generally parallel with lip surface 17 (See FIG. 5a). As lip 16a adjusts, so does the angle of lip surface 17, thereby altering the projection or reference line L or L". Dotted line L' runs generally parallel with dotted line T as shown in FIG. 5b (resting or neutral position), whereas dotted lines L and L" form a slight angle with respect to line T when lip 16a is flexed as in FIG. 5a or FIG. 5c.

In operation, as sliding member 26 is adjusted within or upon main body 12, sliding member 26 may act on a plurality of pivoting members 24 by pivoting the pivoting members 24 about pivot fasteners 30. The elongated aspect of slide fastener hole 36 allows for sliding member 26 to slide or translate along a single path. While pivoting member 24 pivots, linear moving member 22 moves linearly, and preferably moves only linearly. As a result of the adjustment of sliding member 26 and the pivoting of pivoting members 24, tongue (s) 25 rotate within groove(s) 23 causing a plurality of linear moving members 22 to move linearly and substantially perpendicularly to the movement of sliding member 26 (although, the system may operate with any angle between movements of the linear moving members 22 and sliding member 26). As linear moving members 22 move, linear moving members 22 act on cross-bar 20, which, in turn, either pushes against or pulls on lip 16. As a result of the forces exerted on lip 16 from cross-bar 20, lip 16a may move about hinge 14, as demonstrated in FIGS. 5a-5c.

As lip 16a moves and is adjusted, dimensions of a gap or space 16' between lips 16 of die bodies 10a, 10b are adjusted and those adjustments may be measured by indicator system 10, as shown in FIGS. 5a-5c. Indicator member 114 of system 10 may pivot in response to movement of sliding member 26 and lip 16a and indicator point 118 may adjust accordingly and work with indicia 112 to indicate a measurement related to the adjustment of lip 16a (and adjustment of sliding member 26). Such measurement may be any measurement related to the adjustment of lip 16a; for example, the measurement may be the distance between two lips 16, the distance the flexible lip 16a is deflected, or other flexible lip 16a related measurement.

Such a process of adjusting the position of flexible lip 16 may result in efficient and repeatable adjustment of lip 16. The lip adjustment system provides a repeatable gap adjustment, and presents little, if any, lag from one end of the lip to the other end (i.e., the gap as measured via indicator system 10 proximal the adjustment control 100 is the same as, or acceptably the same as, the gap as measured distal the adjustment control 100). Further, positioning of indicia 112 proximate to adjustment control 100 facilitates an operator's ability to precisely adjust dimensions of gap 16' in response to a size of the rolling bank (i.e., a rolling bank is the stacking of product excreted from the die), as the size of the bank is a primary indicator of when gap 16' may need adjusting by an operator.

Adjustment indicator system 10 may also be used in conjunction with extrusion dies that have alternative lip adjustment systems. Preferably lip adjustment system includes a sliding member 26. Preferably the sliding of sliding member 26 results in a very responsive movement of lip 16 such that a change shown by indicator system 10 accurately reflects or corresponds to the degree of change of lip 16. Preferably even slight movement of sliding member 26, to the extent such movement also adjusts lip 16, produces a corresponding change or movement as measured by system 10. The lip adjustment system described above where sliding member 26 slides, produces a corresponding responsive movement in the lip such that measurement of the sliding action of sliding member 26 provides accurate measurement of the movement of lip 16.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular LIP ADJUSTMENT INDICATOR AND SYSTEM as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An extrusion apparatus comprising:
a die body having a main body and a lip extending from a hinge of said main body;
an adjustment system capable of adjusting said lip about said hinge;
an indicator member pivotally communicating with said adjustment system, said indicator member having an arm extending from a body of said indicator, said body in pivotal communication with said main body; and
an end plate connected to said die body and having an opening, said opening configured to receive said arm.

2. The apparatus of claim 1 where said indicator member includes a first fastener hole and a second fastener hole.

3. The apparatus of claim 2 where at least one of said fastener holes is an elongated hole.

4. The apparatus of claim 2 where said first fastener hole is elongated.

5. The apparatus of claim 4 further comprising a fastener positioned in said first fastener hole and connected to a sliding member.

6. An extrusion apparatus comprising:
a die body having a main body and a lip extending from a hinge of said main body;
an adjustment system capable of adjusting said lip about said hinge; and
an indicator member pivotally communicating with said adjustment system; said
apparatus further comprising a sliding member operatively connected to said adjustment system and where said indicator member is pivotally connected to said sliding member.

7. An extrusion apparatus comprising:
a die body having a main body and a lip extending from a hinge of said main body;
an adjustment system capable of adjusting said lip about said hinge;
an indicator member pivotally communicating with said adjustment system;
said apparatus further comprising a sliding member operatively connected to said adjustment system and where said indicator member is pivotally connected to said sliding member; said apparatus further comprising;
a body of said indicator member;
an arm of said indicator member and said arm extending from said body; and
said body in pivotal communication with said main body.

8. The apparatus of claim 7, further comprising:
an end plate connected to said die body; and
said arm extending from said body across said end plate.

9. The apparatus of claim 8, further comprising:
indicia located on said end plate; and
said arm extends from said body to a position adjacent said indicia.

10. The apparatus of claim 7, further comprising:
an end plate connected to said die body; and
an opening in said end plate and said opening receives said arm.

11. The apparatus of claim 10, further comprising:
indicia located adjacent said opening.

12. The apparatus of claim 10, further comprising:
a single-point adjustment control in communication with said sliding member; and
said opening is proximal said single-point adjustment control.

13. An extrusion apparatus comprising:
a first die having a main body and a lip extending from a hinge of said main body;
a second die having a lip;
a distance of a gap spanning from said lip of said first die to said lip of said second die;
an adjustment system capable of adjusting said lip about said hinge adjusting the distance of said gap;
an indicator member pivotally connected with said adjustment system, and
where said indicator member measures a feature of said gap.

14. An extrusion apparatus comprising;
a first die having a main body and a lip extending from a hinge of said main body;
a second die having a lip;
a distance of a gap spanning from said lip of said first die to said lip of said second die;
an adjustment system capable of adjusting said lip about said hinge adjusting the distance of said gap;

an indicator member pivotally communicating with said adjustment system, and where said indicator member measures a feature of said gap;

said indicator member pivotally connected with a sliding member of said adjustment system.

15. The apparatus of claim 14, further comprising:

said indicator pivotally connected to said sliding member of said adjustment system, said sliding member sliding in a direction generally parallel a lip edge of said lip, said indicator member measures the distance of said gap.

16. The apparatus of claim 14, further comprising:

said lip of said first die is adjustable in response to said adjustment system and said indicator member pivots in response to adjustment of said lip.

* * * * *